United States Patent [19]

Collier et al.

[11] 4,053,270
[45] Oct. 11, 1977

[54] APPARATUS FOR THE EXTRUSION OF HIGHLY ORIENTED POLYMERIC MATERIALS

[75] Inventors: John R. Collier, Athens, Ohio; Thomas Y. T. Tam, Chester, Va.

[73] Assignee: Research Corporation, New York, N.Y.

[21] Appl. No.: 653,584

[22] Filed: Jan. 29, 1976

[51] Int. Cl.² ............................................. B29F 3/08
[52] U.S. Cl. ............................. 425/144; 425/379 R; 425/379 S
[58] Field of Search ............... 425/144, 376 R, 378 R, 425/379 R, 461, 378 S, 379 S

[56] References Cited

U.S. PATENT DOCUMENTS

| 2,567,704 | 9/1951 | Grimes | 425/144 |
| 3,078,513 | 2/1963 | Levison et al. | 425/379 X |

Primary Examiner—Robert D. Baldwin
Attorney, Agent, or Firm—Holman & Stern

[57] ABSTRACT

An extrusion method and apparatus for preparing highly oriented fibers and other extrudates of thermoplastic polymeric materials. The apparatus includes a plasticating extruder leading into a reservoir having a constricted discharge orifice opening into the inlet end of an extrusion die orifice, temperature control means for maintaining certain critical temperatures within the reservoir and die, and a variable speed take-up mechanism for withdrawing the extrudate exiting from the die at a critical controlled exit rate. The method includes the steps of feeding a melt of the polymeric material under pressure from the extruder into the reservoir, and flowing the molten polymeric material through the reservoir and the constricted discharge orifice thereof into the inlet end of the die orifice in an elongational flow pattern which induces a molecular orientation in the direction of flow within the molten polymeric material and elevates the effective melting point of the flowing polymeric material as it flows through the entrance region of the die.

9 Claims, 2 Drawing Figures

APPARATUS FOR THE EXTRUSION OF HIGHLY ORIENTED POLYMERIC MATERIALS

BACKGROUND OF THE INVENTION

The present invention relates to the extrusion of thermoplastic polymeric materials, and, more particularly, to an improved extrusion apparatus for producing highly oriented fibers and other extrudates of thermoplastic polymeric material.

In the production of thermoplastic polymeric fibers, it is often desirable to develop as high a degree of molecular orientation in the fiber as possible in order to optimize the strength and other physical properties of the fiber. Present day commercial production of such fibers usually involves the steps of melt or solution spinning, followed by a drawing and/or annealing operation for the purpose of developing at least some degree of such orientation in the fiber. However, the degree of orientation that has generally been achievable by such methods leaves substantial room for improvement.

Theoretically, the ideal crystalline structure for optimizing the strength and other physical properties of such fibers would be one composed substantially entirely of "extended chain crystals", i.e., crystals wherein each polymer chain extends in a completely straight line parallel to the fiber axis. The extended chain crystal is a near perfect form of crystal and is believed to have very desirable physical properties. A number of investigators have reported successfully producing extended chain crystals on a laboratory scale employing various techniques such as shearinduced crystallization, pressure-induced crystallization, and solid state extrusion.

From the standpoint of improved fiber production, the solid state extrusion technique for obtaining extended chain crystals has created a considerable amount of interest. The most promising development along these lines thus far has been the work of Southern et al, *Apply Poly Sci.*, v. 14, 2305-2317 (September, 1970); *DIE Makromol Chem.* Band 162, 1972, Siete 19-30; who reported the solid state extrusion of polyethylene in a capillary rheometer. The fibers produced using their process are highly oriented with unusually high strength; and because they consist of essentially continuous extended chain crystals, the fibers are transparent. This process, however, has two major disadvantages which make it impractical for the commercial production of extended chain crystal fibers. First of all, the process requires extremely high pressures of at least 2000 atmospheres, which is much higher than can be achieved in commercial extruders. Secondly, the process results in very slow formation rates on the order of only a few inches an hour.

The Southern et al method represents an attempt to induce orientation of the polymer chains in the molten polymeric material by means of elongational or extensional flow of the polymer melt into the extrusion die, and to maintain that orientation by subsequent crystallization of the polymer. The problems encountered by Southern et al apparently were due to a premature crystallization of the polymer before it had a chance to enter the extrusion die, thereby producing a plugging effect in the entrance region of the extrusion die. In essence, subsequent extrusion through the die of the plug formed in the entrance region of the die would be somewhat analogous to forcing a plastic golf tee through a cylinder with an inside diameter roughly equivalent to the outside diameter of the shank of the tee. High extrusion forces would be required to deform the golf tee head and extrude it through the cylinder. Likewise, a plugging effect in the entrance region of the die would necessitate the extremely high pressures employed by Southern et al to solid state extrude the crystallized polymer through the die, and would also be responsible for the very slow production rate of the resulting extrudate.

The above-postulated explanation for the difficulty encountered in the Southern et al process becomes particularly plausible when considering the various thermodynamic phenomena which occur in a molten polymeric material undergoing crystallization under elongational or extensional flow conditions such as are developed in the entrance region of the die. Under such flow conditions, the velocity gradient in the direction of flow becomes rather high, and such increasing velocity gradient produces several different effects. First of all, the effective melting point of the polymeric material, i.e., the temperature controlling the point at which crystallization of the polymer melt will be initiated, becomes significantly elevated above the normal melting point of the polymeric material, i.e., the quiescent atmospheric pressure melting point. Secondly, the free energy change upon crystallizaton, i.e., the thermodynamic driving force for crystallization, is also increased. Thirdly, the forces developed by the increasing velocity gradient cause the polymer chains to be extended and to develop parallel alignment, thereby dramatically reducing the major resistance to crystallization. With the effective melting point of the polymeric material becoming elevated, the driving force for crystallization increasing, and the resistance to crystallization decreasing, the interaction of all these effects brings about a condition which is highly conducive to extremely rapid crystallization.

In the method described by Southern et al, the entrance region of the extrusion die was maintained at a temperature which was above the normal melting point of the polymeric material, but apparently below the elevated effective melting point for the flowing polymer. Under such conditions, the above-described thermodynamic considerations would make it very likely for crystallization of the polymeric material to be prematurely induced in the entrance region of the die, thereby bringing about in the entrance region of the die the plugging effect discussed above.

BRIEF SUMMARY OF THE INVENTION

It is accordingly a primary object of the present invention to provide apparatus for the production of highly oriented polymeric fibers having a degree of orientation significantly greater than that of commercial grade fibers, and which are devoid of the above-described disadvantages of the prior art methods and apparatus.

Another object of the present invention is to provide a method for the extrusion of highly oriented transparent polymeric fibers composed at least partially of extended chain crystals, which can be carried out at pressures which are sufficiently low so as to be achievable in ordinary commercial extruders.

A further object of the present invention is to provide a polymeric fiber extrusion method in accordance with the preceding object, which can be carried out on a continuous basis at relatively high fiber production rates in comparison with the prior art methods.

Still another object of the present invention is to provide an extrusion apparatus for carrying out the polymeric fiber extrusion method in accordance with the preceding object, which is relatively simple and economical in design in comparison with the apparatus required for carrying out the prior art methods.

The above and other objects are achieved in accordance with the apparatus of the present invention which provide for the continuous production of a highly oriented fiber of a thermoplastic polymeric material, at relatively high production rates and without the necessity of extremely high pressures. The apparatus employed in the present invention includes a conventional commercial plasticating extruder leading into a reservoir having a constricted discharge orifice opening into the inlet end of an extrusion die orifice, temperature control means for maintaining certain critical temperatures within the reservoir and die, and a variable speed take-up mechanism for withdrawing the extrudate exiting from the die at a critical controlled draw or exit rate.

The method in accordance with the present disclosure includes the steps of providing a melt of the polymeric material in the plasticating extruder, feeding the molten polymeric material under the driving pressure of the plasticating extruder into the reservoir, and flowing the molten polymeric material through the reservoir and the constricted discharge orifice thereof into the inlet end of the die orifice in an elongational flow pattern which induces molecular orientation in the direction of flow within the molten polymeric material and, as described above, elevates the effective melting point of the flowing polymeric material above its normal melting point as the molten polymeric material flows through the entrance region of the die. The temperature of the system is controlled so as to maintain the flowing molten polymeric material above its elevated effective melting point in the reservoir and the inlet end of the die and also so as to maintain in the die an axial temperature gradient descending in the direction of flow through a median die temperature substantially equal to the normal melting point of the polymeric material. In this way, crystallization or solidification of the polymeric material is inhibited in the entrance region of the die and is initiated within the die, thereby avoiding any plugging effect in the entrance region of the die and permitting continuous extrusion of the polymeric material through the die without the necessity of increasing the driving pressure provided by the plasticating extruder. The draw rate of the extrudate exiting from the die is controlled so that the extrudate is partially solidified and at least slightly translucent as it emerges from the die and becomes completely solidified and more transparent immediately thereafter before any radial swelling of the extrudate can occur.

DESCRIPTION OF THE DRAWINGS

The apparatus of the present invention and the advantages thereof will be further understood and appreciated from the following detailed description of a preferred embodiment of the invention which is illustrated in the accompanying drawings, in which.

DESCRIPTION OF PREFERRED EMBODIMENT

Figure 1:
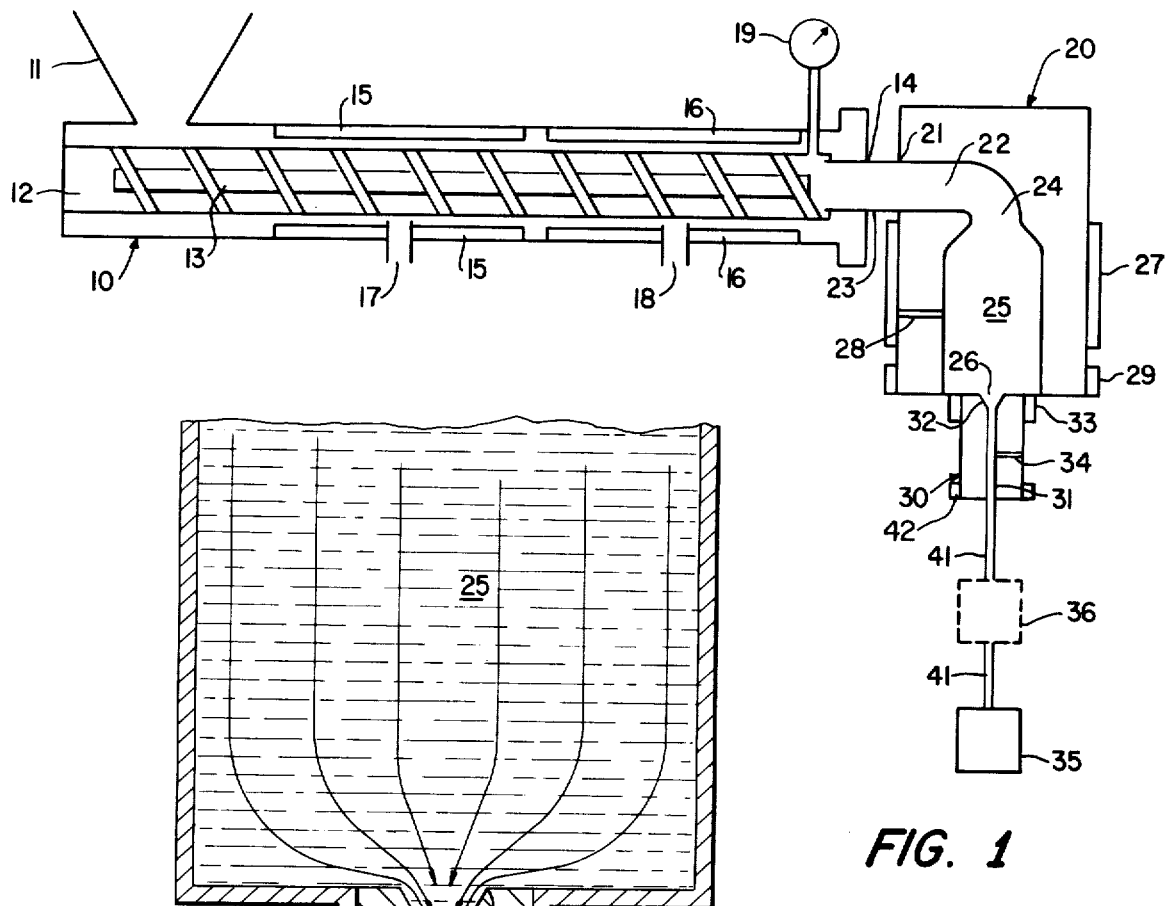
FIG. 1 is a diagrammatic illustration of an extrusion apparatus for carrying out the method according to the present invention.

Referring to FIG. 1 of the drawings, the apparatus for carrying out the method in accordance with the present invention suitably employs a conventional plasticating single screw extruder 10 provided with an inlet hopper 11 leading into the extruder barrel 12 which is provided with driving screw 13 and terminates in an extruder discharge opening 14. The extruder 10 is provided with suitable heating means for maintaining melt temperatures within the barrel 12, such as heating elements 15 and 16 disposed along the extruder walls and suitably monitored by thermocouples 17 and 18, respectively. The extruder 10 is also provided with a suitable pressure gauge 19 at the discharge end of the extruder to indicate the discharge pressure from the extruder during extrusion.

Positioned adjacent to the discharge end of the extruder 10 is a reservoir 20 having an inlet opening 21 leading into an inlet channel 22 having an inside diameter substantially the same as that of the extruder barrel 12. An adapter 23 having a corresponding inside diameter is connected between the extruder discharge opening 14 and the reservoir inlet opening 21 to provide a substantially constant diameter flow channel leading from the extruder barrel 12 into the reservoir inlet channel 22.

The reservoir inlet channel 22 terminates in a 90° steamline elbow angle 24 opening into an enlarged diameter reservoir cavity 25 provided at its opposite end with a constricted discharge orifice 26. The size of the reservoir cavity 25 should be sufficient so as to allow both the masking out of the history of the polymer melt flowing therethrough as well as the development in the polymer melt of an elongational flow pattern toward the constricted discharge orifice 26 of the reservoir. A reservoir cavity having a length to diameter ratio of approximately 4 has been found to be particularly suitable for such purpose. The reservoir 20 is provided with suitable heating means for maintaining melt temperatures within the main body of reservoir cavity 25, such as heating element 27 disposed around the outer walls of the reservoir 20 and suitably monitored by a melt thermocouple 28 located around the middle of the reservoir. For certain embodiments of the present invention, as described more fully hereinafter, it may also be desirable to provide the reservoir 20 with a second heating element 29 disposed around the outer walls of the reservoir at its discharge end for maintaining certain critical melt temperatures in the region of the reservoir discharge orifice 26.

An extrusion die 30 provided with an axial orifice 31 extending therethrough is attached to the discharge end of the reservoir 20, for example, by threaded engagement, so that the reservoir discharge orifice 26 is in alignment with and opens into the inlet end of the die orifice 31. Although the diameter of the die orifice 31 may be the same as that of the reservoir discharge orifice 26, preferably it is somewhat smaller and its inlet end is provided with a tapered entrance angle of, for example, 90° to 105°, thereby creating a tapered throat 32 leading from the reservoir discharge orifice 26 into the main body of the die orifice 31.

It is essential to the practice of the method of the present invention, as described in more detail hereinafter, that a certain critical melt temperature be maintained at the entrance region of the die and that a certain critical axial temperature gradient be maintained in the die orifice. As long as these conditions are met, the actual length of the extrusion die is not critical to the practice of the present invention. However, if the particular extrusion die employed has a sufficient length, for example, about 3 inches, it is preferable to maintain the critical temperature conditions in the entrance region of the die and in the die orifice by providing the extrusion die 30 with a heating element 33 disposed around its outer walls at its inlet end. On the other hand, if the particular extrusion die employed has a substantially shorter length, heating element 33 may be dispensed with, and the critical temperature conditions in the entrance region of the die and in the die orifice may suitably be maintained by means of the heating elements 29 at the discharge end of the reservoir 20. In either case, the heating element employed would be suitably monitored by one or more thermocouples 34 spaced along the die. In the embodiment illustrated in FIG. 1, a single thermocouple 34 is employed for this purpose and is located about midway along the length of the die. Cooling means 42 may be applied at the end of the die to further control the axial temperature gradient in the die. Possible cooling means are air jets, cooling rings with water or air, and immersion of the die tip in a cooling bath, or other suitable heat exchange means.

Situated downstream from the outlet end of the extrusion die 30 is a variable speed take-up device, illustrated diagrammatically in FIG. 1 at 35. The variable speed take-up device is designed to withdraw the fiber exiting from the die orifice 31 at a certain critical controlled draw rate, as explained in more detail hereinafter. Any commercially available variable speed take-up device can be used for this purpose. The apparatus also optionally includes an infrared heating device, illustrated diagrammatically in FIG. 1 at 36, positioned upstream from the take-up device 35 in the path of the completely solidified fiber for the purpose of melting and resolidifying the outer surface of the fiber, as described in more detail hereinafter.

The method and apparatus of the present invention may be used in preparing highly oriented fibers and other extrudates of various thermoplastic polymeric materials, including polyolefins such as polyethylene and polypropylene; polyamides such as polyhexamethylene adipamide, polyhexamethylene sebacamide, polycaprolactam, and the like; polyesters; polyacetals; polystyrene; styrene interpolymers such as acrylonitrile-butadiene-styrene interpolymers (ABS plastics); polyvinyl chloride; polycarbonates; and blends or mixtures thereof.

In carrying out the method of the present invention, the thermoplastic polymeric material, generally in the form of pellets, is fed through the inlet hopper 11 into the barrel 12 of the plasticating extruder 10 wherein under the action of the driving screw 13 and the heating elements 15 and 16, a flowing polymer melt is formed. Under the pressure of the driving screw 13, the molten polymeric material is fed via the adapter 23 through the extruder discharge opening 14 and the reservoir inlet opening 21 into the reservoir inlet channel 22. The flowing molten polymeric material then passes around the elbow angle 24 and into the reservoir cavity 25.

Figure 2:
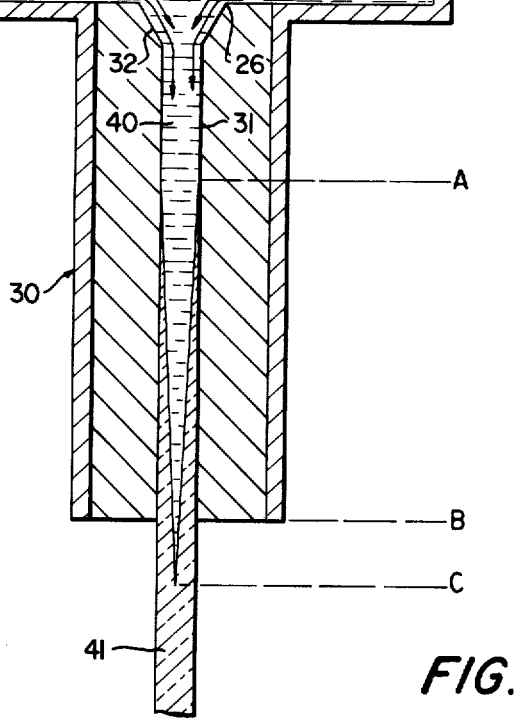
FIG. 2 is an enlarged fragmentary view of a portion of the apparatus shown in FIG. 1, illustrating the flow of the polymer melt through the entrance region of the die and its crystallization or solidification development as it passes through and emerges from the die.

In its flow through the reservoir cavity 25 toward the constricted discharge orifice 26 of the reservoir, the molten polymeric material has its history at least partially masked out and furthermore develops an elongational flow pattern which, as shown in FIG. 2, takes on the shape of a wine glass coming to a stem in the approach to the reservoir discharge orifice 26, which defines the entrance region of the extrusion die 30. The polymer molecules near the entrance region of the die will accelerate in proportion to the area ratio between the upstream and the constricted discharge orifice, resulting in the development of a velocity gradient in the direction of flow. As discussed above, such velocity gradient produces several different effects, the interaction of which brings about a condition which is highly conductive to extremely rapid or solidification. One of these effects is the extension of the polymer chains into parallel alignment, and thus the inducement of molecular orientation in the direction of flow within the molten polymeric material. Another effect of the velocity gradient is to elevate the effective melting point of the polymeric material, i.e., the temperature at which solidification of the polymer melt will be initiated, significantly above the normal melting point of the polymeric material, i.e., the quiescent atmospheric pressure melting point.

If solidification of the polymeric material is allowed to occur in the entrance region of the die, a plugging effect will result in the entrance or narrowing region of the die, making it impossible to continuously extrude the polymeric material through the die under the relatively low driving pressure developed within the extruder 10 (below about 5,000 psi). It is therefore a critical feature of the method of the present invention to inhibit of the polymeric material in the entrance region of the die. This is achieved in accordance with the method of the present invention by maintaining the temperature of the flowing molten polymeric material above its elevated effective melting point throughout the reservoir cavity 25 and the inlet end of the extrusion die orifice 31 by means of the heating element 27 disposed around the main body of the reservoir 20, and by means of either one or both of the heating element 29 disposed around the discharge end of the reservoir 20 and the heating element 33 disposed around the inlet end of the extrusion die 30. In this manner, as shown in FIG. 2, the polymeric material flows through the reservoir discharge orifice 26 into the inlet end of the extrusion die orifice 31 in an unsolidified molten form having a high degree of molecular orientation in the direction of flow.

In order for the high molecular orientation, developed within the polymeric material by its elongational flow through the entrance region of the die, to be retained in the final product, it is necessary to "freeze" such orientation by solidifying the polymeric material before the oriented molecules have sufficient time to relax. In this regard, two influencing factors should be borne in mind. First of all, since relaxation of the oriented polymer molecules requires expansion in volume or in cross-section of flow, it cannot easily occur within the extrusion die orifice 31 due to the radial constraining action of the walls thereof. However, as soon as the polymeric material exits from the outlet end of the extrusion die, it is no longer subject to such radial constraint, and any unsolidified oriented molecules thereof will tend to relax, thereby causing radial swelling of the fiber, unless there is a thick enough rigid skin layer. Secondly, the closer the oriented molten polymeric material is to its melting point, the longer is the time necessary for relaxation to occur. This latter factor makes it highly desirable, in order to prolong for as long as possible the time period before relaxation will occur, to maintain the temperature of the flowing molten polymeric material in the reservoir cavity 25 and in the inlet end of the extrusion die orifice 31 as low as possible above the elevated effective melting point thereof.

Solidification of the highly oriented polymeric material before the oriented molecules thereof have sufficient time to relax, is achieved in accordance with the method of the present invention by a combination of maintaining a certain critical axial temperature gradient in the extrusion die orifice 31, as well as maintaining a certain critical controlled draw rate of the fiber exiting from the outlet end of the die. Considering first the axial temperature gradient in the die orifice, it will be apparent that the heat being applied to the entrance region of the die by either or both of the heating elements 29 and 33, will gradually dissipate along that portion of the die extending below the heating elements and/or be removed by the cooling means 42, thereby setting up in the die orifice an axial temperature gradient descending in the direction of flow. By means of one or more thermocouples 34 spaced along the length of the extrusion die, which act as the sensing device for monitoring the heating elements 29 and 33, this axial temperature gradient is controlled so as to pass through a median die temperature substantially equal to the normal melting point of the polymeric material. In this way, crystallization of the polymeric material is initiated within the die, for example, at point A as illustrated in FIG. 2, which represents the start of the transition of the polymer melt 40 into the completely solidified fiber 41. As illustrated in FIG. 2, this transition comes about by solidification initially occurring only along the walls of the die orifice and thereafter proceeding radially inwardly as the polymeric material continues its flow towards the outlet end of the die.

The fiber 41 is withdrawn from the extrusion die orifice 31 by means of the variable speed take-up device 35, at a critical controlled draw rate such that the fiber emerges from the outlet end of the die orifice 31, at point B as shown in FIG. 2, in a partially solidified and at least slightly translucent state, and becomes completely crystallized and more transparent at point C as shown in FIG. 2, immediately after exiting from the outlet end of the die orifice and before any radial swelling of the fiber can occur. The actual distance between point B and point C will vary with the particular polymeric material being processed and its crystallization or solidification rate. For example, when the polymeric material is polyethylene, which is known to have a very fst crystallization rate, the distance between point B and point C has been found to be not greater than ⅛ of an inch, for a 0.052 inch diameter fiber.

Controlling the draw rate in the manner specified above is critical to obtaining a uniform highly oriented fiber on a continuous basis. If the draw rate is too fast, point C, at which complete solidification has occurred, will be sufficiently far from the outlet end of the die that a thick enough skin layer did not develop, thereby resulting in radial swelling and a higher degree of translucency in the fiber. On the other hand, if the draw rate is too slow, point C will move up inside the extrusion die orifice 31, thereby resulting in plugging of the die and discontinuation of the process.

It should be emphasized that controlling the draw rate in the manner specified above would not necessarily involve a uniform draw rate; hence, the necessity for the take-up device 35 being a variable speed device. For example, should the die temperature drop too low, it would be necessary to increase the draw rate in order to prevent point C from moving up into the inside of the die orifice and cause plugging. On the other hand, should the die temperature become too high, it would be necessary to reduce the draw rate in order to prevent point C from moving far enough away from point B to cause radial swelling of the fiber.

Because the completely solidified fiber 41 is so highly oriented, it might tend to have rather brittle characteristic in the transverse direction. In such cases, it might be desirable to reduce the brittle character of the fiber by passing it through the infrared heating device 36 on its way to being wound up on the take-up device 35, in order to melt and resolidify the outer surface of the fiber, and thereby reduce its brittleness.

The method and apparatus of the present invention are further illustrated by way of the following example of a continuous process for the preparation of a highly oriented transparent fiber of polyethylene. The example is described with reference to FIGS. 1 and 2 of the drawings and the foregoing description thereof.

EXAMPLE

The apparatus employed was that of FIG. 1, with the exception that the heating element 33 and the infrared heating device 36 were not utilized. The extruder 10 was a model 200 Brabender single screw plasticating extruder with a barrel diameter of 0.75 inch and L/D of 20, and with a screw having a 4:1 compression ratio. Heating elements 15 and 16 were both 800 watt heaters. The thermocouples 17 and 18 were located at 8 inches and 15 inches, respectively, along the barrel, extending ⅛ inch away from the inside of the barrel. The reservoir cavity 25 was 1 inch in diameter and 4 inches long. Heating element 29 was a half inch wide band-heater. The extrusion die 30 was a stainless steel die ¾ inch in length, having a 1 inch outside diameter and a 0.052 inch inside diameter, and provided with a tapered entrance angle of 90°.

Polyethylene pellets (Soltex Fortiflex G60–42, melt index 0.42, normal melting point 132° C) were fed into the extruder 10, operating at startup with a screw speed set at 20 RPM, heating elements 15 and 16 both set at 200° C, heating element 27 set at 250° C, and heating element 29 set at 175° C. After a steady state homogeneous extrusion was reached, i.e., with molten polymer being extruded through the die, the screw speed was reset at 10 RPM, heating element 15 was reset at 160° C, heating element 16 was reset at 175° C, heating element 27 was reset at 140° C, and heating element 29 was reset at 135° C.

When the temperatures reached the set points, the temperatures halfway down the die was 132° C, and the extrusion pressure was between 4,000 and 4,500 psi. The fiber exiting from the die at this stage exhibited a clear boundary line where the fiber changed in appearance from slightly translucent to transparent (point C in FIG. 2, i.e., the point at hich complete crystallization has occurred). By means of the variable speed take-up device 35, the draw rate of the fiber exiting from the die was controlled so as to maintain such boundary line at a point between the outlet and of the die and ⅛ inch therebelow. At the above operating conditions, continuous operation of the process was achieved, with a production rate of the fiber of about 3½ inch per minute.

The polyethylene fiber thus produced was transparent and was found by X-ray analysis to be as highly oriented as those produced by the Southern et al high pressure solid state extrusion process discussed above. Thus, the HermanStein orientation functions for the fiber produced by the present method described above was 0.9964 with a standard deviation of 0.0009 in the c-axis and −0.49 in the a and b-axes, compared to the Southern et al. fibers exhibiting 0.966 in the c-axis and 0.5 in the a and b-axes. Moreover, differential scanning calorimetry indicated a 10° C elevation of DSC melting peak temperatures for the polyethylene fibers prepared as above in accordance with the present method, compared to the melting peak temperature exhibited by the same sample after recrystallization in the DSC and remelting. These results are consistent with those reported by Southern et al for the extended chain crystal fibers produced by their high pressure solid state extrusion method.

Since polyethylene has such an extremely rapid crystallization rate and short relaxation time, extremely careful control of temperature and draw rate, as described above, is necessary with this polymer in order to produce the fiber on a continuous basis. A slight variation of temperature and/or drawing rate could cause plugging in the die and terminate the process. With other thermoplastic polymeric materials having lower crystallization or solidification rates and longer relaxation times, the method of the present invention is not as sensitive. For example, a highly oriented transparent fiber of polypropylene was produced employing the method and apparatus of the present invention, and the operation was found to be much smoother than the polyethylene and to provide a faster production rate (15 inches per minute). It was noted, however that while the polypropylene fiber showed as much orientation in the skin shell as that of polyethylene, the inner core thereof was less oriented, apparently due to the fact that the inner core molecules have more of a chance to relax because of the slower crystallization rate.

While the present invention has been described in its preferred embodiments for the extrusion of highly oriented polymeric fibers, it will be readily appreciated and understood that the method and apparatus of the present invention are likewise applicable for the extrusion of other types of extrudates of highly oriented thermoplastic polymeric materials, such as rods, sheets, tubing and the like, by appropriate modifications, particularly in the shape and/or dimensions of the die, which would be readily apparent to those skilled in the art.

I claim:

1. An extrusion apparatus for producing a highly oriented extrudate of a thermoplastic polymeric material, comprising:
   a. a plasticating extruder means for providing a melt of said polymeric material and for feeding said melt under pressure through a discharge opening in said extruder means;
   b. an elongational flow pattern-developing reservoir means having an inlet opening communicating with said discharge opening of said extruder means, an enlarged diameter flow cavity, and a constricted discharge orifice, the relative geometries of said flow cavity and said constricted discharge orifice being such as to develop within the molten polymeric material flowing from said extruder means through said reservoir means an elongational flow pattern which induces molecular orientation in the direction of flow within said molten polymeric material and elevates the effective melting point of said flowing polymeric material;
   c. an orientation-retaining extrusion die means provided with an orifice extending therethrough, said die orifice having an inlet end and an outlet end, said constricted discharge orifice of said reservoir means opening into said inlet end of said die orifice so as to permit flow of the oriented molten polymeric material from said reservoir means into said die means without any increase in the cross-sectional area of flow, said die orifice having a cross-sectional area no greater than that of said constricted discharge orifice of said reservoir means so as to radially constrain said oriented molten polymeric material flowing therethrough against its natural tendency to lose its molecular orientation by radial swelling;
   d. temperature control means for maintaining the temperature of said flowing molten polymeric material at at least about said elevated effective melting point thereof in said reservoir means and said inlet end of said die orifice and for maintaining in said die orifice an axial temperature gradient descending in the direction of flow through a median die temperature substantially equal to the normal melting point of said polymeric material so that solidification of said polymeric material will be inhibited in the entrance region of said die means and initiated within said die means; and
   e. a variable speed take-up means for withdrawing from said outlet end of said die orifice a partially solidified extrudate of said polymeric material at a controlled draw rate such that said extrudate becomes completely solidified immediately after exiting from said outlet end of said die orifice and before any radial swelling of said extrudate can occur.

2. The apparatus of claim 1, further including an infrared heating means positioned upstream from said take-up means in the path of said completely solidified extrudate for melting and resolidifying the outer surface of said extrudate.

3. The apparatus of claim 1, wherein the flow cavity of said reservoir means has a length to diameter ratio of approximately 4.

4. The apparatus of claim 1, wherein said inlet end of said die orifice is provided with a tapered entrance angle of between 90° and 105°.

5. The apparatus of claim 1, wherein said temperature control means for maintaining said temperature in said reservoir means comprises a heating element disposed around the outer walls of said reservoir means and a melt thermocouple located around the middle of said reservoir means for monitoring said heating element.

6. The apparatus of claim 1, wherein said temperature control means for maintaining said temperature in said inlet end of said die orifice and for maintaining said axial temperature gradient in said die orifice comprises a heating element disposed around the entrance region of said die means and one or more thermocouples spaced axially along said die means for monitoring said heating element.

7. The apparatus of claim 6, wherein said heating element is disposed around the outer walls of said reservoir means at its discharge end.

8. The apparatus of claim 6, wherein said heating element is disposed around the outer walls of said extrusion die means at its inlet end.

9. The apparatus of claim 6, wherein said temperature control means further includes a cooling means disposed in the vicinity of the outlet end of said die means.

* * * * *